May 26, 1964     J. L. HOLAHAN ETAL     3,134,683
FRUIT PRODUCT AND PROCESS FOR THE PREPARATION THEREOF
Filed April 19, 1961
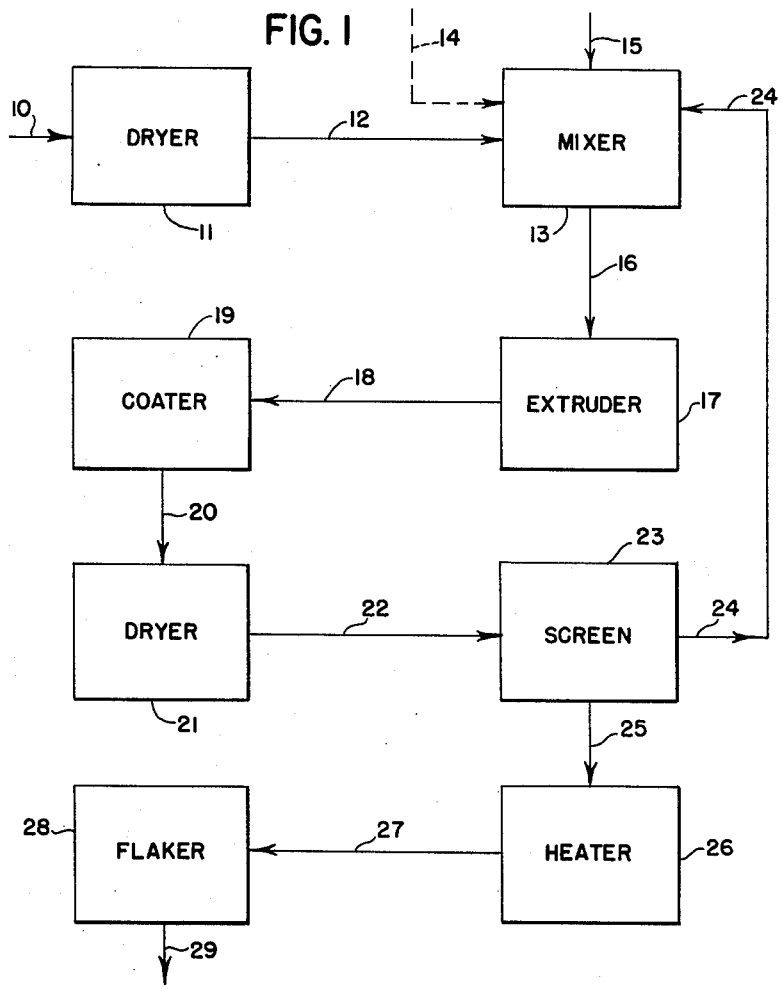
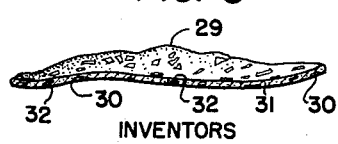
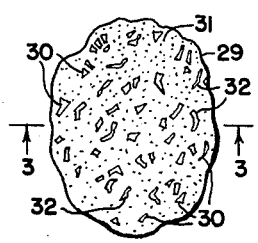
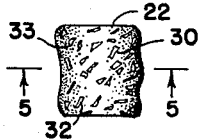
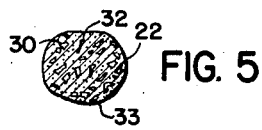
INVENTORS
JOHN L. HOLAHAN
WILLIAM L. McKOWN
ROLF MOEN
VERNE E. WEISS
BY *Sherman J. Hemmer*
AGENT

United States Patent Office 3,134,683
Patented May 26, 1964

3,134,683
FRUIT PRODUCT AND PROCESS FOR THE PREPARATION THEREOF
John L. Holahan, Minneapolis, William L. McKown, St. Louis Park, Minneapolis, Rolf Moen, Hopkins, and Verne E. Weiss, Minneapolis, Minn., assignors to General Mills, Inc., a corporation of Delaware
Filed Apr. 19, 1961, Ser. No. 104,145
10 Claims. (Cl. 99—204)

This invention relates to a process for the preparation of a novel fruit product and more specifically to a fruit product particularly suited for incorporation in a breakfast cereal.

The combination of a breakfast cereal and fresh fruit has been widely served and enjoyed. By judiciously selecting the fruit, the dish will have unusually high nutrient values. Unfortunately, this savory, healthful dish is not readily available to many because of the inconvenience of supplying, preserving and preparing the fresh fruit. In addition to this inconvenience, during many seasons of the year, desirable fresh fruits are unavailable or are difficultly procurable at prohibitive prices.

To overcome this problem, manufacturers of breakfast cereals have attempted to incorporate fruit in their cereal product. Since fresh fruit will normally spoil during the storage of the cereal, producers have applied various preservative methods to the incorporated fruit. These methods have met with very limited success due to a number of difficulties. Typical of these problems are those encountered in the addition of raisins to cereal products. Under normal conditions of storage and use, the raisins in such a product often tend to become hard and tough as compared to the cereal. This difference in texture has caused such products to be unacceptable to much of the consuming public. Similarly, many other dried fruits have tough fibrous structure and texture when dried sufficiently to prevent spoilage. Needless to say, this type of texture is not appetizing.

In addition to this problem, the incorporated fruit is of a different density than the cereal, and tends to separate in the package. Thus, during the agitation supplied to the cereal package during shipping and handling, the fruit will be accumulated in one portion of the package. When this mixture is served, some portions will be high in fruit, while other portions will have a low fruit content. Still another problem which has been encountered is that of fruit agglomeration. Thus, in addition to the accumulation problem described above, various fruit products tend to stick to one another when packaged, thereby forming large agglomerates of fruit.

To overcome some of the difficulties encountered when dried fruits are employed, some producers have attempted vigorous cooking and toasting procedures. While in some cases these procedures tend to avoid some of the above difficulties, generally the natural fruit flavor and nutrients of the fruit are destroyed by such cooking processes.

The entire problem is further complicated by the fact that many fruits contain relatively large amounts of invert sugars which are quite hygroscopic. The attendant water absorption from ambient moist air often causes such fried fruit products to be sticky and subject to spoilage.

It is an object of this invention to provide an economic process for the preparation of dried fruit products. It is another object of this invention to provide a novel fruit product made from fresh ripe fruit having the natural fruit flavor and nutrients. It is a further object of this invention to provide a fruit product which is relatively free from spoilage. It is still another object of this invention to provide a fruit product having a texture comparable to breakfast cereal. It is still a further object of this invention to provide a novel fruit product which is in moisture equilibrium with the cereal. It is still a further object of this invention to provide a novel fruit product which will not agglomerate in the cereal package. It is yet another object of this invention to provide a novel fruit product having a crisp, tender texture. Other objects will appear hereinafter.

The objects of this invention are accomplished by a process which comprises preparing a thoroughly mixed, extrudable composition comprising fruit, fat, sugar and starch, extruding said composition, partially drying the extrudate, heating the dried extrudate, and flattening the heated dried extrudate. In accordance of the present invention, it was discovered that tender, crisp fruit products having natural fruit flavors and nutrients were obtained by the process of the present invention.

Virtually all fruits are useful in the present invention. Specific examples of particularly useful fruits include apples, apricots, bananas, cherries, dates, figs, raisins, loganberries, nectarines, peaches, pears, prunes, oranges, pineapple, lemons, raspberries, strawberries, blueberries and blackberries. As these fruits exist in their natural state, they generally contain a higher percentage of moisture than is desirable for the present process. Therefore, it is desirable to partially dry the fruits before their use in the present invention. The optimum moisture level for the fruit depends on a great number of factors, and is best determined by trial for the particular fruit product. Among the vairables which must be considered include the types and amounts of other ingredients employed, and in particular, the moisture content of such products. Generally, the moisture level should be adjusted so that the composition is readily extrudable. Thus, high moisture content tends to provide a composition which is too soft and mushy for easy extrusion. On the other hand, a low moisture content composition is difficult to extrude since the extrudate tends to crumble.

Generally, it is preferable to have the moisture content of the extrudate in the range of 3 to 25% by weight, based on the total composition of the extrudate. The optimum moisture content for a particular fruit will depend on the nature of the fruit, the relative proportions of other ingredients, the extrusion conditions, and the like. In most situations, the optimum moisture content is within the range of 5 to 15% by weight, based on the total composition of the extrudate. Thus, the fruit should be dried to such a degree that the total composition has the desired moisture content. For amounts of fruit generally employed, the moisture content of the fruit should be in the range of 8 to 40%.

The quantity of fruit employed is not critical. Generally, the amount employed depends upon the texture desired in the final product and upon the desired flavored intensity. Of course, artificial flavors and colorings can be added to the mixture in order to strengthen or provide the desired flavors whenever possible; however, we prefer not to employ artificial additives since one of the most attractive features of the invention is that it enables one to capture the true essence of natural fruit. It is advantageous to employ approximately 10 to 50% fruit by weight based on the total composition. Higher or lower fruit concentrations can also be employed, if desired. In addition to employing solid fruits, fruit juice concentrates can be employed to provide the product with added natural color and flavor. When fruit juice concentrates, such as grape juice, are employed to provide the complete fruit flavor, it is desirable to employ portions of a solid, relatively tasteless fruit, such as certain varieties of apples. This provides a preferable texture and eating quality. Still further, it is possible to employ, in some situations, other portions of the fruit product. For example, orange peel and other citrus peels may be utilized to provide all or a portion of the citrus flavor in citrus-flavored flakes.

An optional ingredient in the instant product is fat. Fat is incorporated into the mixture to improve the texture and moisture equilibrium characteristics of the product. In addition, fat serves as a processing aid in the extrusion and flattening steps. Generally, the fat acts as a lubricant and tends to reduce the sticking of the product to processing equipment. In most cases, it is preferred to employ a fat which contains an emulsifier. Approximately 2 to 5% fat by weight, based on the total composition, is advantageously employed in the present process. As a general rule, all types of edible fats and shortenings can be employed in the present invention. The term "fat" is used herein in its broadest sense and is meant to include fat-like materials which will perform substantially the above-described functions. Thus, lecithin, vegetable oils, hydrogenated vegetable oils, animal fats and hydrogenated animal fats are included within the meaning of the term. The optimum amount of fat employed depends a great deal on the type of shortening which is selected and is therefore best determined by trial.

The major part of the remaining material is made up of sugars and starch. These materials are used to modify the flavor and texture of the finished product provided by the fruit and fat portions. The types of sugars normally employed are sucrose, lactose and dextrose. While sucrose provides a useful ingredient, the use of sucrose alone yields a product which is highly sweet. Therefore, it is advantageous to supply a portion of the sugar as dextrose, lactose or other sugars with less sweetening power than sucrose. In this sense, the dextrose and lactose provide a convenient diluent. The exact ratio of sugars depends greatly upon the desired sweetness of the final product. It is advantageous to have the sugar in a finely divided state. While it need not be as fine as confectioner's sugar, it should be substantially finer than standard granulated sugar. Coarse sugars give products which have a grainy appearance. The total amount of sugar employed generally comprises from about 30 to 70% by weight, based on the total composition of the final product. Starch, generally wheat starch, is added to the product as a processing aid, binder and filler. Wheat starch in the range of 5 to 20% by weight, based on the total composition, is most advantageously employed. Since lactose has properties equivalent to starch for the purposes of this invention, lactose can be substituted for all or a part of the starch.

In some applications, it is desirable to substitute other materials for a portion of the above carbohydrates. Specific examples of such ingredients include egg solids, milk solids, soy protein and various kinds of flour.

The invention will be better understood with reference to the attached drawings in which FIGURE 1 is a flow diagram illustrating a preferred embodiment of the present invention; FIGURE 2 is a plan view of the final product; FIGURE 3 is a section along lines 3—3 of FIGURE 2; FIGURE 4 is a dried pellet, and FIGURE 5 is a section along lines 5—5 of FIGURE 4.

In FIGURE 1, fresh fruit 10 is fed to the drier 11. Since fresh fruit 10 is generally damaged by high temperatures, it is preferable to carry out the drying operation at relatively low temperatures. In order to obtain optimum drying rates, it is generally necessary to carry out the drying step at reduced pressures. Thus, the drier 11 is normally the type referred to as a vacuum drier.

The dried fruit 12 is fed to the mixer 13. Alternatively, if no drying is necessary or desirable, the fruit 14 may be fed directly to the mixer 13. Generally, this situation arises when the fruit 14 is predried, or when it has sufficiently low moisture so that drying is not required. When fruit juice concentrates are employed as all or part of the fruits, this material is also fed directly to the mixer 13. The remaining ingredients 15 are fed to the mixer 13. The remaining ingredients 15 include fat, sugar, starch, flavorings, food colorings, and other materials. Generally, any type of mixer can be employed for the mixer 13. A preferred type of mixer 13 is that referred to in the trade by the term "muller." The action of the muller is comparable to that obtained with a mortar and pestle. It causes a break up of agglomerates by a kneading, smearing, spatulate action.

The mixing is continued until the mixture has attained the proper consistency for extrusion. Generally, it is preferable to add all the ingredients simultaneously to the mixer 13. However, in some situations, it may be advantageous to add the ingredients to the mixer 13 individually. If, for some reason, the mixture has too low a moisture content for good mixing and extrusion, additional water can be added during the mixing stage.

The mixer 13 should provide sufficient shearing force to cause breakage of the fruit. However, it is generally not desirable to have the fruit homogenously dispersed throughout the mixture. Such homogeneity produces flakes of uniform color and texture which are generally not as appetizing in appearance as those having small flecks of fruit material.

The mixture 16 is fed to the extruder 17 where it is formed into an extrudate 18. Generally, it is preferred to employ an extruder 17 which also pelletizes the extrudate 18, although the extrusion and pelletizing operations can be performed separately. The extrusion step is one of the most important of the process. The moisture content and proportions of other ingredients must be adjusted so as to provide a uniform extrudate 18. The dimensions of the extrudate 18, however, are not particularly critical and will depend upon the desired size of the flake. The minimum dimension will be the cross-section where the extrudate is so small that it crumbles. This usually occurs at about 1/16 inch to 1/32 inch in diameter. The maximum dimension is generally regulated by the size of the extrudate which can be readily used. Seldom is it necessary or advantageous to prepare extrudates having a cross-section greater than 3/4 inch.

The extrudate 18, preferably in the form of pellets, is fed to the coater 19. The coater supplies a coating of starch or other materials to the extrudate 18 to provide coated pellets 20. This can generally be carried out by feeding the extrudate 18 into a bed of starch. The coated pellets 20 are then separated from the bed of starch by screening or some other similar method. While starch is the preferred coating material, other materials can be used if desired. The purpose of the coating operation is to prevent agglomeration of the extrudate 18 into large pieces.

The coated pellets 20 are fed to a drier 21 where the moisture is reduced to the level desired in the final flakes 29. This second drying step is generally necessitated by the fact that the mixture 16 usually must be of a higher moisture content for proper extrusion than is desired in the final flake 29. In most instances, the moisture content of the dried pellets 22 should be in the range of 1 to 7%. Moisture contents above about 12% are generally not advantageous since the products are not stable and tend to spoil. High temperatures are also to be avoided in the drier 21. Therefore, the coated pellets 20 are generally dried under vacuum.

The dried pellets 22 are fed to a screen 23 which separates the properly-sized pellets 25 from the rejected material 24. The rejected material 24 consists of finely-divided material and pellets which have agglomerated. The rejected material 24 can be salvaged by recycling to the mixer 13. While the screening step is not absolutely necessary, it is a highly desirable operation since it permits the formation of uniformly size flakes 29.

The properly sized pellets 25 are fed to the heater 26. The purpose of the heater 26 is to increase the temperature of the pellets to the point where they will become plastic in character. For most types of fruit pellets, a temperature in the range of 130 to 150° F. is very desirable; temperatures outside the range of 100 to 180° F. are seldom necessary. At the elevated temperature, the properly sized pellets 25 become plastic in character so that they can be readily flattened. A preferable method of heating the pellets is by means of infrared lamps. These lamps heat the product quickly and without undue detrimental effect to the flavor and nutritional values.

The heated pellets 27 from the heater 26 are fed to flaker 28 to provide the flakes 29. The flaker 28 is made up of two large rolls spaced about .010 to .025 inch apart. The exact thickness of the flakes 29 is dictated by the desired texture of the product. Generally, thicknesses of .014 to .018 inch are preferred. The flakes 29 are relatively hard and crisp when cool, but soften upon heating. The moisture content of the pellets in the flaking and heating steps is quite important. Generally, moisture contents of 1 to 7% are preferred. If the pellets are too dry, a higher temperature is necessary to soften them with attendant detriment to the flavors and nutrients of the product. If, on the other hand, the pellets are too wet, the flakes 29 will be limp and will readily stick together. The flakes 29 are cooled and packaged for use or mixed with a desired breakfast cereal to give a product having a pleasant and flavorable taste and appearance. The flakes can also be used as a topping for ice cream, cooked cereal and the like.

Generally, essential steps in the above process are the mixing step performed by the mixer 13, the extruding step performed by the extruder 17, the drying step performed by the drier 21, the heating step performed by the heater 26 and the flaking step performed by the flaker 28. The coating step performed by the coater 19 and the screening step performed by the screen 23 may be eliminated if desired. The use of these two steps, however, tends to enhance the quality of the product. The heating step performed by the heater 26 and the flaking step performed by the flaker 28 can be combined into a single operation if a suitable apparatus is provided.

Where the extrusion is carried out at very high temperatures, the moisture content of the mixture 16 can be lowered considerably since the material is more thermoplastic at the higher temperatures. These high temperatures also tend to further dry the extrudate 18. Thus, where sufficiently high temperatures are employed, it is possible to produce an extrudate 18 which requires no further drying.

Other similar short cuts will be obvious to those in the art. Generally, it has been found that these revised processes somewhat reduce the quality of the product, but where this sacrifice can be tolerated, such expedients are highly useful.

The determination of moisture in fruit has been the subject of considerable investigation. The values attained vary considerably between different analytical methods. Thus, in order to insure uniformity, moisture determination should be made by standard methods. The methods used herein for determining the moisture content for dried fruits and pellets are as set forth in the 9th Edition of "Official Methods of Analysis of the Association of Official Agricultural Chemists," published by the Association of Official Agricultural Chemists, Washington, D.C. Specifically, the method employed is set forth on page 264 of the 9th Edition, Paragraph 20.008, entitled "Moisture in Dried Fruits." When moisture determinations are carried out on low moisture content materials, extreme care should be taken in order that the standard procedure is meticulously followed. In addition, in samples having low moisture content, it is helpful to make one or more duplicate determinations.

FIGURES 2 and 3 illustrates a finished flake 29. In this particular illustration, the flake 29 was prepared from dried apple pulp and apple peel, according to the method of Example VIII. Particles of apple peel 30 and apple pulp 32 appear among the more dried, dough matrix 31.

The preferred crispness of the flake 29 is such that flake 29 can be slowly bent through an angle of 90° without fracture, but when rapidly bent through the same angle, the flake 29 fractures. The flakes 29 are thermoplastic in nature. When subject to body heat, they become noticeably softer. The flakes 29 are also generally translucent at the preferred thickness of 0.014 to 0.018 inch, although the darker colored fruits produce flakes which are nearly opaque.

FIGURE 4 and FIGURE 5 illustrate a dried pellet 22 which is ready for processing into a finished flake 29. Particles of apple peel 30 and apple pulp 32 can be seen through the starch coating 33.

Other fruits will produce flakes of a similar appearance. The major variations will be the color of the flakes and the size and discernibility of the individual fruit particles.

While the major interest in the present invention is in the finished flakes 29, it has been discovered that the dried pellets 22 also possess unique features which make them highly useful in certain instances. The most important of these uses is as an additive to various culinary preparations. In pancakes, for example, the dried pellets can provide centers of fruit and fruit flavor. Particularly suited for this use are the berries—blueberries, blackberries, raspberries, etc. In cakes, both the finished flakes 29 and the pellets 22 can be used in cakes to provide centers of fruit and fruit flavor throughout the cake.

The invention will be better understood with reference to the following examples which illustrate certain preferred embodiments of the present invention. Unless otherwise stated, all parts and percentages used herein are by weight.

*Example I*

Into a "Simpson Porto-Muller" mix-muller manufactured by National Engineering Company, Chicago, Illinois, was charged 40 lbs. of raisins having a moisture content of 10%, 20 lbs. dry sucrose having a particle size distribution such that 75% by weight passes through a #100 U.S. Standard Sieve and 50% passes through a #230 U.S. Standard Sieve, 21 lbs. of dextrose containing 10% by weight of moisture, 12 lbs. of refined wheat starch, containing 10% moisture, 5 lbs. of rearranged lard containing 7.5% glyceryl lactyl palmitate, 3.75% soft monoglyceride, and 2 lbs. of five-fold grape juice concentrate. The material was mulled for 15 minutes. The mixture, which had dough-like properties, was charged to a 4 inch cereal-dough extruder having a grooved barrel and equipped with a multihole die having 195 orifices of 1/8 inch diameter lined with "Teflon" fluorocarbon resin. A rotating blade scraped the face of the die to produce pellets of approximately 1/8 inch. The pellets dropped onto a moving bed of wheat starch, thereby enrobing the pellets with starch. The excess was removed by sifting so that 5% of starch remained with the pellets. The coated pellets were spread 1 inch on drying trays and placed in a vacuum dryer having heated shelves. The pellets were dried for 6 hours at a shelf temperature of 150° F., at a pressure of 15 mm. Hg absolute. The dried pellets, having a moisture content of 3%, were fed to a vibrating sifter equipped with wire mesh screens having openings of 13/64 inch and 7/64 inch. Pellets which passed through the larger screen and were retained on the smaller screen were conveyed under an infrared heating unit by means of a vibrating conveyor. After the pellets had been heated for 15 seconds to a temperature of 140° F., they were immediately fed to a pair of cereal flaking rolls spaced to give 15 mil flakes. The flakes were immediately mixed with a flaked wheat cereal at a fruit flake-to-cereal ratio of 1:2. This provided a nutritious, appetizing dish when served with milk. Storage tests of the cereal-fruit flake product showed that the fruit portion of the product retained its flavor and texture longer than the cereal.

Example II

Using substantially the equipment and procedure of Example I, a dough was prepared from 40 lbs. dried peaches having a moisture content of 30%, 26 lbs. dry sucrose described in Example I, 17 lbs. of dextrose containing 10% by weight of moisture, 12 lbs. of wheat starch, 5 lbs. of rearranged lard containing 7.5% glycerol lactyl paymitate, 3.75% soft monoglyceride, 3.75% hard monoglyceride. The dough was extruded into pellets ⅛ inch in diameter and coated with starch. The starch-coated pellets were dried to moisture content of 3% and subsequently heated to a temperature of 140°. The heated pelelts were formed into 15-mil flakes by means of cereal flaking rolls. The fruit flakes were cooled on a vibrating conveyor. There was recovered thin flakes which were capable of being bent through an angle of 90° when the bending force was slowly applied, but which fractured when the bending force was rapidly applied. These peach flavored flakes provided a nutritious, appetizing dish when served with cereal and milk. Another portion of the flakes was spread over ice cream, thereby providing a tasteful, attractive serving. The difference in texture between the fruit flakes and the ice cream greatly enhances the palatability of the combination.

Example III

Using substantially the same equipment and procedure as in Example I, a dough is prepared from 12 lbs. dried red raspberries having a moisture content of 30%, 32 lbs. dry sucrose, 33 lbs. of dextrose having a moisture content of 10%, 15 lbs. of wheat starch containing 10% moisture, 3 lbs. of the rearranged lard of Example I, 5 lbs. of five-fold raspberry juice concentrate, 0.022 lb. of FD & C Red No. 2, and 2 lbs. of water. The mixture was extruded, coated, and formed into flakes as in Example I. There was obtained a tasty, red raspberry flavored fruit flake having the physical properties of the flakes described in Example II. A cake batter was prepared and fruit flakes made in accordance with this example were mixed into the batter prior to baking. A white cake was also made, incorporating into the cake the wet pellets just after extrusion. After baking, there were obtained cakes having distributed therethrough centers of red raspberry flavor and color. In addition, the raspberry flavored particles provided a slightly different texture to the cake at the point where they were included.

Example IV

Using substantially the same equipment and procedure as in Example I, a dough was prepared from 10 lbs. of five-fold grape juice concentrate, 20 lbs. dried, chopped Rome Beauty apples having a moisture content of 10%, 26 lbs. of dry sucrose, 26 lbs. of dextrose having a moisture content of 10%, 15 lbs. of wheat starch having a moisture content of 10%, and 3 lbs. of the lard used in Example I. The dough was extruded into ⅛-inch diameter pellets, coated with starch, heated, and flattened, to produce 15-mil grape-flavored flakes.

Example V

Using substantially the same procedure and equipment as in Example I, a dough was prepared from 15 lbs. of dried strawberries having a moisture content of 10%, 33 lbs. dry sucrose, 32 lbs. dextrose having a moisture content of 10%, 16 lbs. of wheat starch having a moisture content of 10%, 4 lbs. of the lard of Example I and 6 lbs. of water. After processing the dough as in Example I, there was obtained a strawberry-flavored fruit flake having physical properties similar to the flakes of Example II.

Example VI

Using substantially the same equipment and procedure as in Example I, a dough was prepared from 30 lbs. of dried blueberries having a moisture content of 10%, 26 lbs. sucrose, 27 lbs. dextrose having a moisture content of 10%, 14 lbs. of wheat starch having a moisture content of 10%, 3 lbs. of the lard of Example I and 2 lbs. water. The dough was processed as in Example I, to produce 15-mil flakes having a blueberry flavor. A white cake batter was prepared and blueberry flakes prepared by the method of this example were stirred into the batter just prior to baking. There was obtained a cake having pockets of blueberry flavor.

Example VII

Example II was repeated except that dried apricots having 28% moisture were substituted for the peaches of Example II. There was obtained apricot-flavored flakes having the physical properties of the flakes of Example II.

Example VIII

A dough was prepared from a chopped, dried apple mixture having 10% moisture made up of 16 lbs. dried Winesap apples, 16 lbs. dried Delicious apples, 8 lbs. chopped Winesap apple peel, 17 lbs. dry sucrose, 26 lbs. dextrose having a moisture content of 10%, 12 lbs. wheat starch having a moisture content of 10%, 5 lbs. of the lard of Example I, .0009 lb. of FD & C Red No. 2 food coloring, .066 lbs. ground cinnamon and 6 lbs. of water. The dough was processed as in Example I to form 15-mil flakes. These apple-flavored flakes had small flecks of apple peel throughout.

Example IX

A dough was prepared from 30 lbs. dried bananas having a moisture content of 1%, 34 lbs. dextrose having a moisture content of 10%, 3 lbs. of the lard of Example I, 33 lbs. lactose and 10 lbs. water. The dough was processed as in Example I to form 15-mil flakes. These flakes had substantially the properties of flakes of Example II.

Example X

A dough was prepared from 12 lbs. dried raspberries having a moisture content of 30%, 53 lbs. dextrose, 7 lbs. fat, 10 lbs. nonfat milk solids, 3 lbs. of 5-fold raspberry juice concentrate and 15 lbs. flour. The mixture was extruded, coated and formed into flakes as in Example I. There was obtained a red raspberry-flavored fruit flakes which were capable of being bent through an angle of 90° when the bending force was slowly applied, but which fractured when the bending force was rapidly applied.

Example XI

A dough was prepared from 12 lbs. dried raspberries having a moisture content of 30%, 56 lbs. sucrose, 3 lbs. of the lard of Example I, 8 lbs. of 5-fold raspberry juice concentrate, 20 lbs. flour and 1 lb. lecithin. The dough was treated as in Example I to produce raspberry flavored fruit flakes having substantially the properties of the flakes of Example X.

Example XII

A dough was prepared from 40 lbs. of dried peaches having a moisture content of 30%, 32 lbs. dextrose, containing 10% by weight of moisture, 3 lbs. of the lard of Example I, and 25 lbs. of potato starch. The dough was treated as in Example I to produce peach-flavored fruit flakes.

Example XIII

A dough was prepared from 20 lbs. of dried raisins having a moisture content of 10%, 29 lbs. sucrose, 29 lbs. dextrose having moisture content of 10%, 15 lbs. of wheat starch, 5 lbs. of the lard of Example I, and 2 lbs. of 5-fold grapefruit juice concentrate. The dough was extruded into pellets ⅛ inch in diameter and coated with starch. Starch-coated pellets were dried to 3% moisturt content, heated to a temperature of 140° by means of infrared radiation, and formed into 15-mil flakes by means of cereal flaking rolls. There were obtained raisin flakes which were capable of being bent through an angle of 90° when the bending force was fully applied, but which fractured when the bending force was rapidly applied.

*Example XIV*

A dough was prepared from the 80 lbs. of dried raisins having a moisture content of 10%, 5 lbs. sucrose, 5 lbs. dextrose having a moisture content of 10%, 5 lbs. of wheat starch, and 5 lbs. of the lard of Example I. The dough was extruded and formed into flakes by the method of Example I. There was obtained fruit flakes having substantially the properties of the flakes of Example XIII.

*Example XV*

A dough was prepared from 21 pounds of black raspberries having a moisture content of 30%, 26 lbs. sucrose, 30 lbs. of dextrose having a moisture content of 10%, 16 lbs. of wheat starch, 2 lbs. of the lard of Example I, and 5 lbs. of 5-fold black raspberry juice concentrate. The dough was extruded and formed into flakes using the method of Example I. There was obtained a black raspberry-flavored fruit flake which passed the bending test of Example II.

*Example XVI*

Example XV was repeated except blackberries having the moisture content of 30% were substituted for the black raspberries of Example XV and blackberry juice concentrate was substituted for the black raspberry juice concentrate of Example XV. The results were substantially the same as Example XV.

*Example XVII*

A dough was prepared from 30 lbs. of prunes having the moisture content of 28%, 26 lbs. sucrose, 27 lbs. of dextrose having a moisture content of 10%, 14 lbs. of wheat starch having a moisture content of 10%, and 3 lbs. lard. After treating the dough as in Example I, there was obtained prune-flavored fruit flakes which passed the bending test of Example II.

*Example XVIII*

A dough was prepared from 18 lbs. of banana powder having the moisture content of 1%, 25 lbs. sucrose, 25 lbs. dextrose having the moisture content of 25%, 15 lbs. of wheat starch having a moisture content of 10%, 5 lbs. of lard, 12 lbs. of nonfat dry milk solids, 0.005 lb. of FD & C #5 yellow food coloring, 0.0005 lb. of FD & C #6 yellow food coloring and 10 lbs. of water. The mixture was extruded into pellets, pellets were coated with starch, dried, screened, heated and flaked as in Example I. There was obtained banana-flavored fruit flakes which passed the bending test of Example II.

*Example XIX*

A dough was prepared from 10 lbs. of chopped orange peel having a moisture content of 10%, 30 lbs. dried Rome Beauty apples having a moisture content of 24%, 17 lbs. sucrose, 26 lbs. dextrose having a moisture content of 10%, 15 lbs. of wheat starch having a moisture content of 10%, and 2 lbs. of lard. After forming the mixture into flakes by the method of Example I, there was obtained orange-flavored fruit flakes which passed the bending test of Example II.

*Example XX*

A dough was prepared from 40 lbs. of pears having a moisture content of 24%, 17 lbs. sucrose, 26 lbs. of dextrose having a moisture content of 10%, 12 lbs. of wheat starch having a moisture content of 10%, and 5 lbs. lard. The material was formed into flakes by the method of Example I. There were obtained pear-flavored fruit flakes which were capable of being bent through an angle of 90° when the bending force was fully applied, but which fractured when the bending force was rapidly applied.

*Example XXI*

A dough was prepared from 30 lbs. of pineapple having a moisture content of 24%, 30 lbs. sucrose, 30 lbs. of dextrose having the moisture content of 10%, 7 lbs. of wheat starch having a moisture content of 10% and 3 lbs. lard. The mixture was formed into fruit flakes by the method of Example I and there was obtained pineapple-flavored fruit flakes which passed the bending test of Example II.

*Example XXII*

A dough was prepared from 30 lbs. of cherries having a moisture content of 24%, 26 lbs. sucrose, 27 lbs. of dextrose having a moisture content of 10%, 14 lbs. of wheat starch having a moisture content of 10%, and 3 lbs. lard. The mixture was extruded into pellets, and the pellets were covered with starch. After drying and screening out the odd-sized pellets, the properly sized pellets were heated and flaked. There was obtained cherry-flavored fruit flakes which passed the bending test of Example II.

*Example XXIII*

A dough was prepared from 40 lbs. of dates having a moisture content of 24%, 26 lbs. sucrose, 17 lbs. dextrose having a moisture content of 10%, 12 lbs. of wheat starch having a moisture content of 10% and 5 lbs. fat. After forming flakes by the method of Example I, there was obtained date-flavored fruit flakes which passed the bending test of Example II.

The foregoing examples have been included as illustrations of certain preferred embodiments of the present invention and are not to be construed as limitations on the scope thereof.

The products produced by the process of the present invention are useful as components in dry breakfast cereals, and as an additive for a variety of culinary preparations.

The embodiments of the present invention in which an exclusive property or privilege is claimed are defined as follows:

1. The process which comprises: preparing a thoroughly mixed, extrudable composition consisting essentially of fruit, about 30–70% by weight sugar and about 5–20% by weight starch; extruding the composition to form an extrudate having a diameter of more than about 1/32 inch and less than about 3/4 inch; pelletizing the extrudate; drying the resulting pellets to a moisture content of less than about 12% by weight; heating the dried pellets to a temperature in the range of about 100 to 180° F. to render said pellets plastic; and flattening the heated, dried pellets to obtain fruit flavored flakes.

2. The process of claim 1 wherein the extrudable composition also contains about 2–5% by weight fat.

3. The process of claim 1 wherein the heated, dried pellets are flattened to a thickness of about 0.010 to 0.025 inch.

4. The process of claim 1 wherein the sugar consists of a mixture of sucrose and dextrose.

5. The process of claim 1 wherein the fruit is raisins.

6. The process of claim 1 wherein the fruit is strawberries.

7. The process of claim 1 wherein the fruit is bananas.

8. The fruit flavored flakes produced by the process of claim 1.

9. The process which comprises: preparing a thoroughly mixed, extrudable composition consisting essentially of about 10–50% by weight fruit, about 30–70% by weight sugar and about 5–20% by weight starch, said composition having a moisture content in the range of about 3 to 25% by weight; extruding the composition to form an extrudate having a diameter of more than about 1/32 inch and less than about 3/4 inch; pelletizing the extrudate; drying the resulting pellets to a moisture content of less than about 12% by weight; heating the dried pellets to a temperature in the range of about 100 to 180° F. to render said pellets plastic; and flattening the heated, dried pellets to obtain fruit flavored flakes.

10. The process of claim 9 wherein the extrudable composition also contains about 2–5% by weight fat.

References Cited in the file of this patent

UNITED STATES PATENTS

| | | |
|---|---|---|
| 1,018,462 | Warner | Feb. 27, 1912 |
| 1,236,382 | Von Epler | Aug. 7, 1917 |
| 2,965,502 | Connelly | Dec. 20, 1960 |